United States Patent [19]

Clark

[11] Patent Number: 5,297,150
[45] Date of Patent: Mar. 22, 1994

[54] RULE-BASED METHOD FOR TESTING OF PROGRAMMING SEGMENTS

[75] Inventor: Andrew L. Clark, Katonah, N.Y.

[73] Assignee: International Business Machines Corporation, Armonk, N.Y.

[21] Appl. No.: 900,169

[22] Filed: Jun. 17, 1992

[51] Int. Cl.$^5$ ............................................. G06F 11/00
[52] U.S. Cl. ...................................... 371/19; 395/575; 395/922; 371/29.1
[58] Field of Search ................... 371/19, 15.1, 29.1; 364/275.5, 184, 275.6, 944.6; 395/575, 922, 919, 916

[56] References Cited

U.S. PATENT DOCUMENTS

| | | | |
|---|---|---|---|
| 4,694,420 | 9/1987 | Pettet et al. | 371/19 |
| 4,730,315 | 3/1988 | Saito et al. | 371/19 |
| 4,833,641 | 5/1989 | Lerner | 364/900 |
| 4,885,717 | 12/1989 | Beck et al. | 364/900 |
| 4,964,125 | 10/1990 | Kim | 395/916 |
| 5,020,011 | 5/1991 | Stark et al. | 395/916 |
| 5,058,033 | 10/1991 | Bonissone et al. | 364/513 |
| 5,107,499 | 4/1992 | Lirov et al. | 371/15.1 |
| 5,168,563 | 12/1992 | Shenoy et al. | 395/500 |

OTHER PUBLICATIONS

"Software Analysis Test Tool", User's Guide, Release 2, Publication No. SC26-4678-01 International Business Machines Corporation 1990, 1991.

*Primary Examiner*—Robert W. Beausoliel, Jr.
*Assistant Examiner*—Trinh L. Tu
*Attorney, Agent, or Firm*—Perman & Green

[57] ABSTRACT

A method for determining a set of flow paths in a code listing that are most likely to fail comprises the steps of: converting the code listing to a directed acyclic graph representation, the representation including nodes and directed edges, each node representing a basic block of unconditional code statements. The method loads, as facts into a knowledge base, representations of the nodes and edges, and unconditional statements from the basic blocks. The method also loads, as rules into the knowledge base, conditional statements and complexity indicator values for conditional and unconditional statements. Weights are assigned to each node based upon complexity indicator values for statements associated with the node. A determination is then made of a set of flow paths through the code listing, each path ranked in order of assigned weights, those flow paths with larger assigned weights being assumed as those paths most likely to fail.

19 Claims, 6 Drawing Sheets

LOAD DAG TO KNOWLEDGE BASE

```
LOAD FACTS:
  -NODES
  -EDGES                                    — 60
  -FROM BASIC BLOCKS
  -UNCONDITIONAL STATEMENTS
```

↓

```
LOAD RULES:
  -STATEMENTS WITH CONDITION(S)
    "IF__ , THEN__"
  -SEGMENT ANALYSIS STATEMENTS
  E.G.-KIND AND NUMBER OF BOOLEAN
       OPERATORS
     -NUMBER OF CONDITIONS FOR
      BRANCH ACTION                         — 62
     -NUMBER OF BRANCHES ON
      CONDITION
     -RULES RE LANGUAGE SYNTAX
  -GRAPHICAL PRESENTATION
   REQUIREMENTS
     E.G. BOXES REPRESENT NODES,
          ARROWS REPRESENT EDGES,
          ETC.
```

↓

```
LOAD HEURISTICS:
  RANK EACH STATEMENTS COMPLEXITY BY:
   -NUMBER OF LOGICAL OPERATORS; AND/OR    — 64
   -NUMBER OF EXPRESSED CONDITIONS;
    AND/OR
   -NUMBER OF EXPRESSED BRANCHES;
    AND/OR
   -ETC.
```

↓

```
ASSIGN WEIGHT VALUE TO EACH NODE
BASED ON CONDITIONAL STATEMENT            — 66
COMPLEXITY HEURISTIC
```

RULE-BASED METHOD FOR TESTING OF PROGRAMMING SEGMENTS

FIELD OF THE INVENTION

This invention relates to software testing systems and, more particularly, to a rule-based method for identifying procedural program segments most likely to fail.

BACKGROUND OF THE INVENTION

The creation of software and, in particular, the creation of high quality application software has become increasingly expensive. The failure of an application under unforeseen circumstances can create disastrous results and undermine the market acceptance for the application. As a result, increasing efforts are being given to prerelease testing of application software. Based upon the realization that some aspects of software testing can be automated, the prior art has created a number of products specifically directed to aiding the software development engineer in the testing of an application.

In U.S. Pat. No. 4,885,717 to Beck et al., a "diagramming debugger" creates a graphical representation of a sequence of messages that are sent during the operation of an object-oriented program. The debugger displays representations of the transmitting and receiving objects on a screen to enable the development person to understand the internal functioning of the program. As program operations proceed, a box representing an object is added to the display whenever an object first receives a message. Arrows are drawn on the screen between method symbols within display boxes, providing a graphical representation of the order in which messages are sent. In this manner, the debugger "animates" program operation so as to make the sequence of messages sent and methods performed easier to comprehend.

In U.S. Pat. No. 4,730,315 to Saito et al., a diagrammatic method is disclosed for testing a program that enables interactive operations between the user and the program. In this case, a procedure starts with a diagram produced interactively by the user which is then translated into a source program embodying the diagrammatic specifications. Then, the source program is tested and execution results are displayed which indicate the success or lack of success of the test.

In U.S. Pat. No. 4,833,641 to Lerner, a method is described for converting a program's code listing into a hard copy or a display of the program's logic and control flow. This method enables programs that have been altered and re-altered to be analyzed for their logic and control flow.

The International Business Machines Corporation has offered a software application entitled "Software Analysis Test Tool" which enables the software developer to measure and analyze the effectiveness of testing of an application. The Software Analysis Test Tool can both statically and dynamically analyze an application; analyze the coverage of a test performed on the application, and report on the test's coverage. The Software Analysis Test Tool extracts information from the application's compiler listing and displays a diagram of the application's structure. The "tool" enables the user to browse the diagram to understand the software's structure, identify test case design needs and to locate inefficient and/or unused code. In analyzing an application, the Software Analysis Test Tool uses information from the application's execution history files and simulates the application during run time. It highlights paths in a displayed structure diagram that are exercised or not exercised by the test cases. It also is capable of highlighting source code statements to indicate how frequently each statement is exercised during simulation. In this regard, the Software Analysis Test Tool also measures the extent to which the test data has exercised the application structure and then displays the test coverage results in a graphic format. Summary and detailed reports of test coverage results are also generated.

As indicated by the description of the Software Analysis Test Tool, the charting or graphing of a program's structure is known in the prior art. A control flow graph is a known software chart that models the control structure of a program. It is a directed graph comprising nodes and edges. Each node represents a basic block of sequential program code, whereas edges represent possible control paths between blocks, the traversal of a path being dependent upon a conditional statement at the end of a basic block. A basic block is a sequence of program statements that is entered only via the first statement in the sequence, executed sequentially, and is departed only via the last statement.

A directed acyclic graph (DAG) is a control flow graph in which the lines (or arcs or links) that connect nodes have arrows attached that indicate the direction of control flow traversal. Acyclic refers to the lack of cycles (loops) in the graph. Each node has, at most, two branches (edges) that connect to two subsidiary modes. Nodes with two subsidiary nodes have a true or false condition associated with one edge and a complementary condition associated with the other edge.

Normally in a flow graph, there is a unique start node where the graph is entered and a terminal node which is a unique node for exiting the graph. There may be a plurality of terminal nodes depending upon the control flow of the program. All nodes of the flow graph are reachable from the start node. In certain cases, more than one start and terminal node are provided for in the control flow.

Traversal of a sequence of edges in a DAG is called a "walk", and a "path" is defined as a walk through the graph beginning at a start node and ending at a terminal node.

An expert system, a form of which is employed by the invention described herein, is a software application that performs functions in a manner similar to that of a human who is expert in the field. An expert system can solve problems by drawing inferences from a collection of available rules and facts. Expert systems generally have two parts: a knowledge base and an inference engine. The knowledge base is a data base that holds specific facts and rules about the subject under consideration. The inference engine is a part of the expert system that uses the contents of the knowledge base to find an object in the knowledge base that matches a desired format or characteristic.

Inference engines employ various search techniques, e.g., forward-chaining - which is a method of traversing a network of logical AND's and OR's until a terminal point or goal is reached; backward-chaining which is the reverse of forward-chaining where the inference engine begins with a goal and requests information to confirm or deny it, etc. Expert systems/knowledge-bases are available commercially, e.g., The Integrated Reasoning Shell (TIRS) from the International Business Machines Corp; AION, from AION Inc., etc.

Even with the availability of prior art systems for program debugging and testing, the increasing complexity of application software indicates the necessity of providing further automated aids to the software engineer that will enable the identification of error-prone portions of code.

Accordingly, it is an object of this invention to provide a rule-based method for testing programming segments wherein segments that are prone to failure are identified automatically.

It is a further object of this invention to provide an improved method for testing programming segments that enables a series of heuristics to be used to determine the probability of failure of a segment.

It is still another object of this invention to provide a method for program analysis testing that automatically identifies a set of program paths most susceptible to failure.

SUMMARY OF THE INVENTION

A method for determining a set of flow paths in a code listing that are most likely to fail comprises the steps of: converting the code listing to a directed acyclic graph representation, the representation including nodes and directed edges, each node representing a basic block of unconditional code statements. The method loads, as facts into a knowledge base, representations of the nodes and edges, and unconditional statements from the basic blocks. The method also loads, as rules into the knowledge base, conditional statements and complexity indicator values for conditional and unconditional statements. Weights are assigned to each node based upon complexity indicator values for statements associated with the node. A determination is then made of a set of flow paths through the code listing, each path ranked in order of assigned weights, those flow paths with larger assigned weights being assumed as those paths most likely to fail.

DETAILED DESCRIPTION OF THE INVENTION

Figure 1:
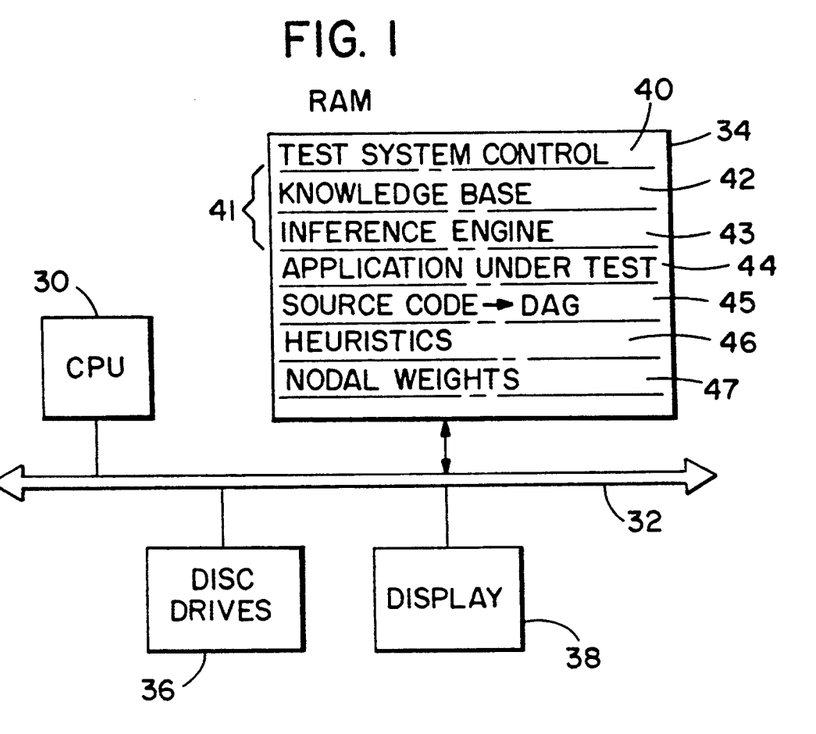
FIG. 1 is a high level block diagram of a data processing system that implements the invention.

Referring to FIG. 1, a block diagram is shown of a data processing system that implements the invention. A central processing unit 30 is connected via a bus 32 to a random access memory (RAM) 34, a set of disk files 36 and a display 38. RAM 34 contains software program listings that implement the invention. Those listings comprise a test system control program 40, and an expert system 41 comprising a knowledge base 42 and an inference engine 43. Expert system 41 operates under control of test system control program 40 and provides an overall ability to "dissect" portions of an application under test (e.g. 44). RAM 34 also includes a number of additional allocated stores and sub-routines, e.g., a source code to DAG converter 45; a heuristics store 46; and a nodal weight assignment store 47. The interrelationship of each of the aforementioned software segments and stores will be described below.

If it is assumed that application 46 is being tested, the objective of test system control program 40 is to identify those flow paths in application 44 which are most likely to contain a "bug" or error. In order to accomplish this, test system control program 40 initially causes the conversion of application 46 (or a portion thereof) into a DAG.

Figure 2:
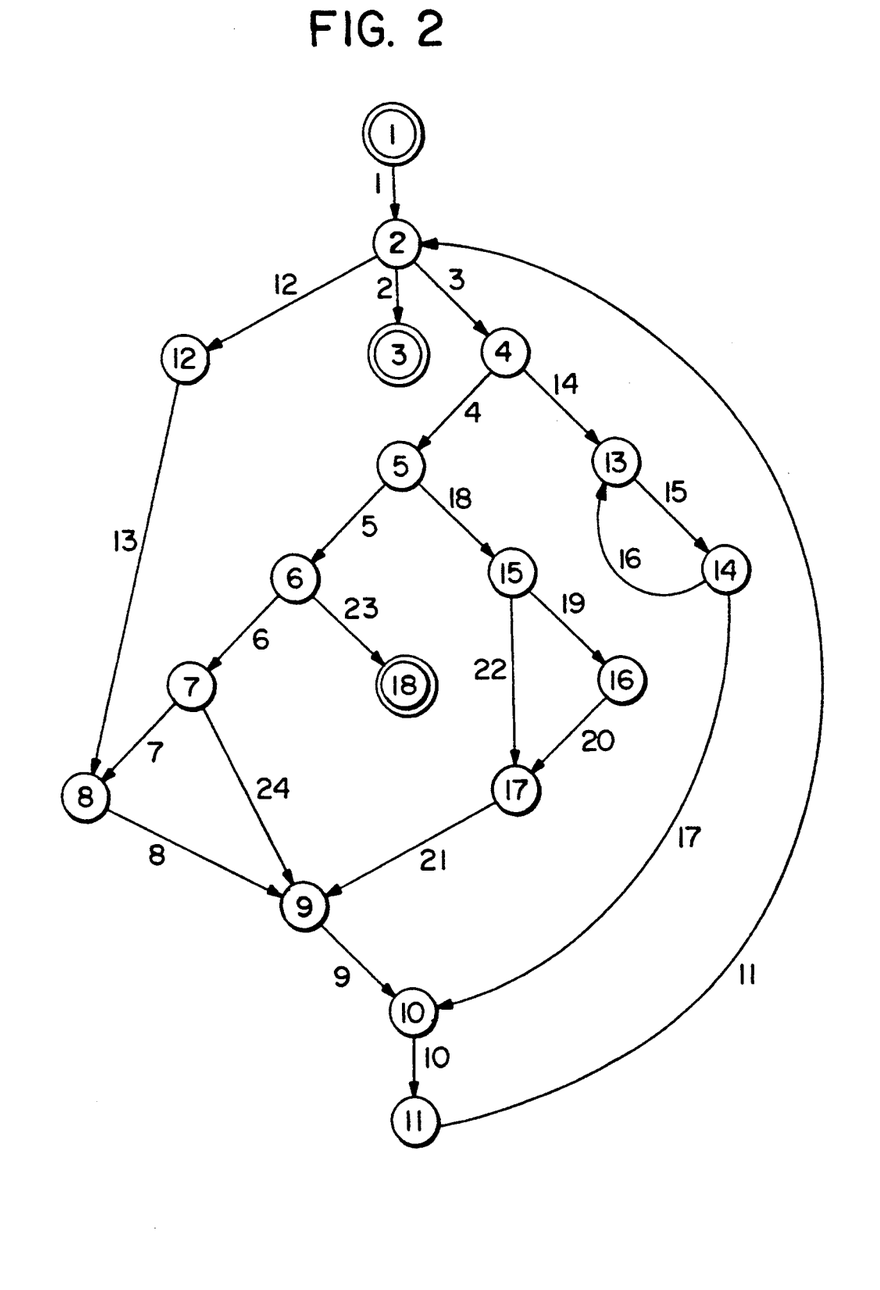
FIG. 2 is a representation of a directed control flow graph of a software listing.

An example of a directed control flow graph (not acyclic) is shown in FIG. 2. The flow graph contains a plurality of nodes 1-18 with node 1 being the start node and nodes 3, and 18 being exit nodes. The flow graph of FIG. 2 is "directed" since lines with arrows connect nodes and indicate the direction of flow control. Those lines are also referred to as "ledges". The numbers assigned to each edge indicate the sequence of operations that occur in proceeding through the flow graph.

The flow graph of FIG. 2 is not acyclic as there are loops that exist between nodes 11 and 2 and between nodes 14 and 13. As will become apparent any command that requires a loop operation is converted by the invention to a straight line procedure and its loop portions are not recognized. The reason for this is that if one procedure is properly carried out, it is assumed that repetitions of that procedure will be carried out in proper order.

Figure 3:
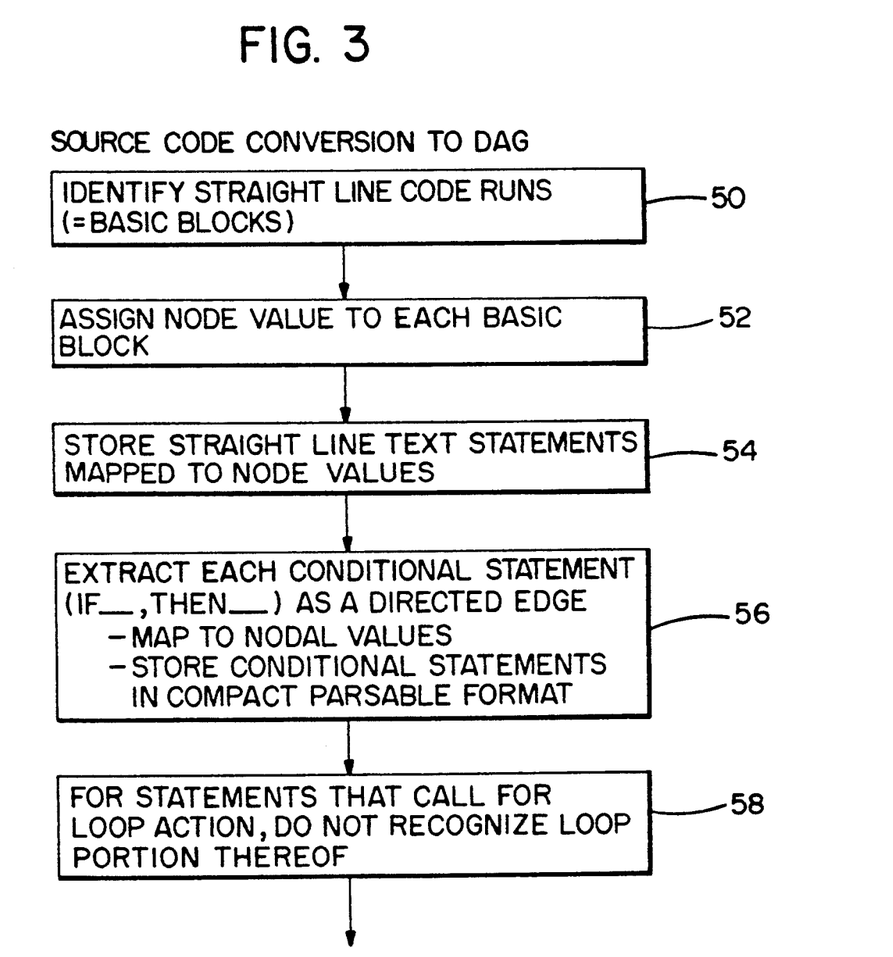
FIG. 3 is a high level flow diagram of a procedure whereby a source code listing is converted to a DAG.

Turning now to FIG. 3, the procedure for converting a source code listing to a DAG is illustrated. Initially, straight line code runs (i.e., also called "basic blocks") are identified (box 50). As indicated above, a straight code run is one wherein, after reaching an entry point, the code invariably reaches the exit point with no branches in-between. Each identified basic block is designated as a node and assigned a value (box 52), and the text included within the basic block is then stored with an indication that maps the stored text to the node from which it came (box 54).

Each basic block, by definition, terminates with either an exit statement or a conditional statement. A conditional statement is one which states a condition, and then indicates that if the condition is met, that a corresponding action is to be taken. There are many levels of complexity of conditional statements, but they all satisfy the aforesaid structural definition.

The procedure continues by extracting each conditional statement from the source code listing, identifying it as an "edge" and appending to it values which indicate its starting and destination nodes. The conditional statement is then stored in a compact parable format so that it can be later analyzed (box 56). For any statement within the source code listing that calls for a loop, the conversion action does not recognize the loop portion and just converts the statement into a non-loop format for the DAG. That statement is then included with either the associated basic block or with the associated conditional statement, as the case may be (box 58).

Figure 4:
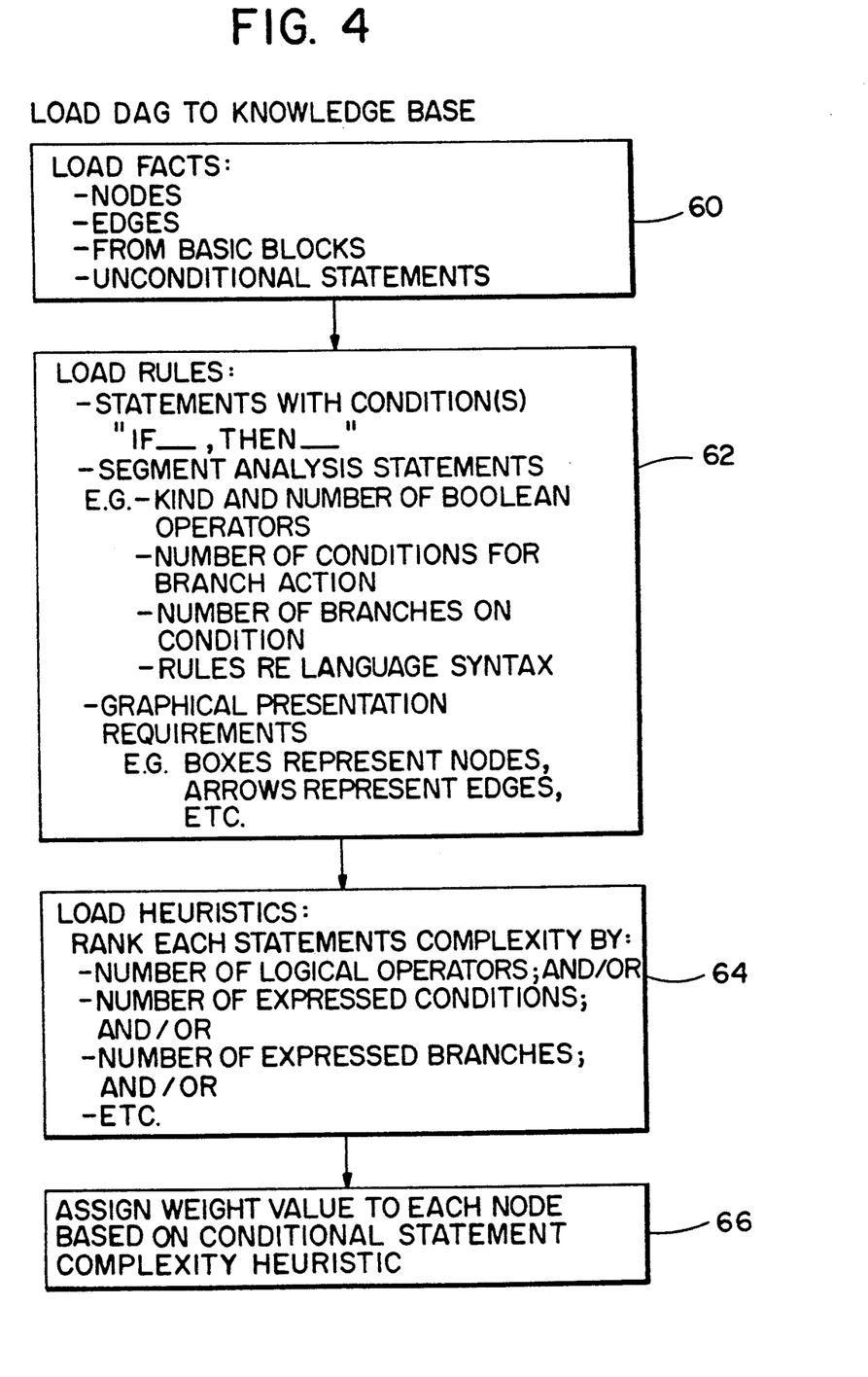
FIG. 4 is a high level flow diagram which illustrates the procedure for loading the DAG into a knowledge base and for the establishment of heuristics with respect thereto.

In FIG. 4, the procedure continues with the loading of the DAG into knowledge base 42 (FIG. 1).

Initially, facts are loaded (box 60) and include the identification of nodes and edges and, from each basic block, the listed unconditional statements from each that have already been identified. The procedure then moves to load rules into knowledge base 42 (box 62). Among the rules that are loaded are conditional statements from the source listing, code characteristics which enable analysis of the various program segments, and graphical presentation requirements. The conditional statements are all of the statements that have been previously extracted from the code listing and individually stored. Thus, each conditional statement, in essence, becomes a rule which requires that if a certain condition occurs, that the program proceeds to a specific action.

The rules that enable program segment analysis may take many forms, dependent upon the type of application being analyzed. In this instance, since it is desired to determine flow paths which are most likely to fail, it is assumed that those flow paths with the most complex function statements, those with the largest number of logical operators, those with many branches on conditions etc. are the paths which are more likely to fail.

To undertake a program segment analysis, the following rule set is preferred: For each statement, count the number of logical operations, the different kinds of logical operations and the number of logical operators; count the number of conditions required to achieve a branch; count the number of branches that occur on condition for each statement; etc. A further set of rules describes the hierarchy of control flow within the program. Another set of rules describes the graphical presentation requirements for subsequent display of the results of the analysis (e.g., a box represents a basic block; arrows represent edges; etc.)

Finally, a set of heuristics is entered as rules into the knowledge base, which heuristics enable the identification of complex flow paths in the program segments (box 64).

A set of heuristics which may be used for such a determination is as follows: Rank each statement as to its complexity by the number of logical operators contained within it; and/or the number of expressed conditions stated within it; and/or the number of expressed branches; etc. Clearly, additional heuristics are contemplated by this invention, but they will vary in accordance with the type and kind of application software being debugged. Nevertheless, it is a basic tenet of this invention that a flow path of higher complexity will tend to fail more often than one of lesser complexity. Thus, the objective of the heuristics is to determine and rank those flow paths in the code listing which are of relatively higher complexity than others.

Once the heuristics are entered, knowledge base 42 and inference engine 43 proceed to rank each node as to its complexity (box 66). As an example, each node may be initially weighted in accordance with the complexity of the conditional statement that terminates the node.

Once a determination is made of those nodes having appended highly complex conditional statements, the weighting value of each node can be further modified in accordance with the complexity of the unconditional statements contained within the basic block represented by the node. This will enable a further ranking of each node in accordance with both its internal and external complexities.

Figure 5:
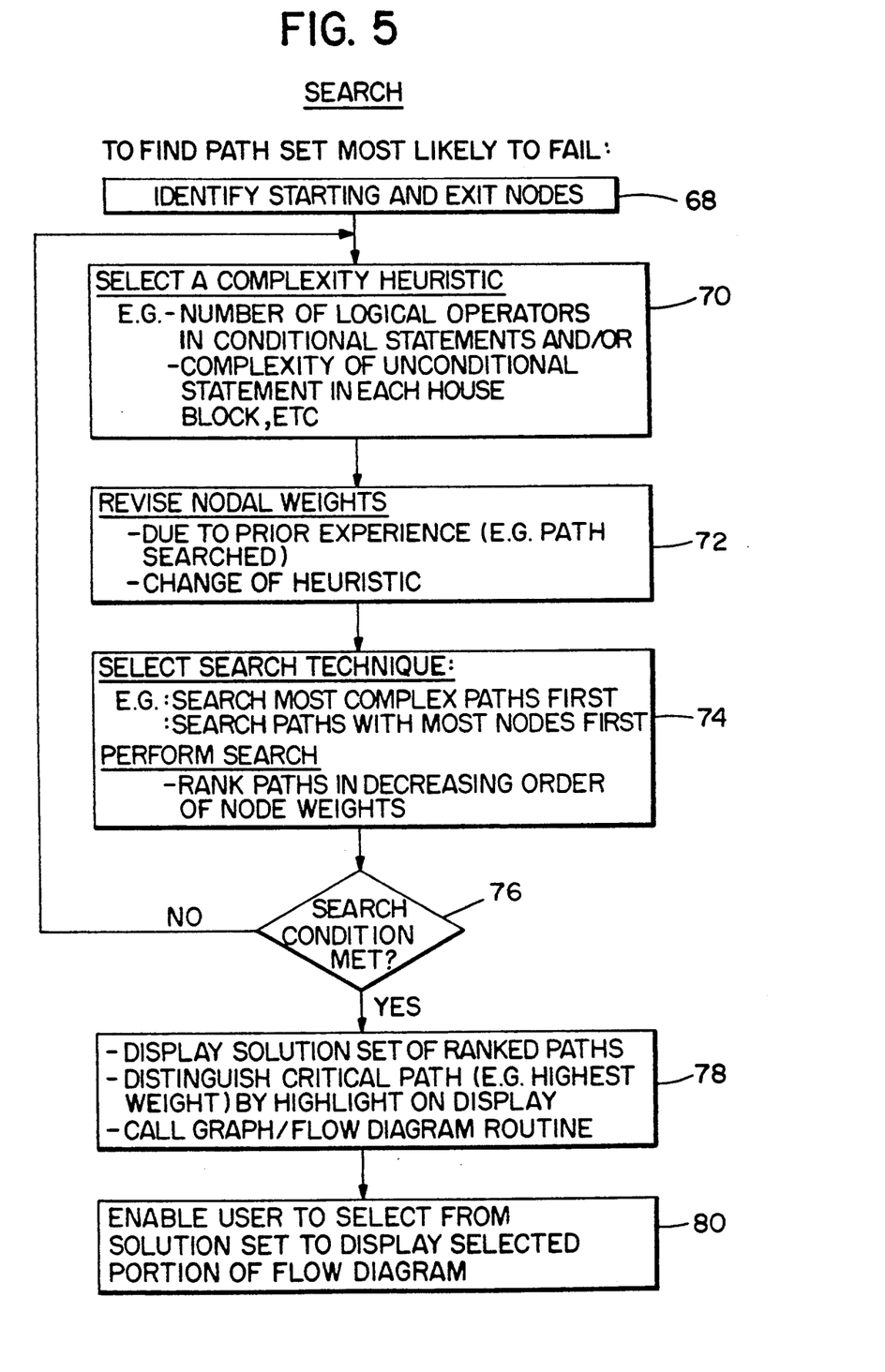
FIG. 5 is a high level flow diagram which illustrates the procedures for a search of the knowledge base to find a set of code listing flow paths that are most likely to fail.

The knowledge base 42, in combination with inference engine 43, is now in a position to perform a search to find those program segment paths that are most likely to fail. The procedure commences (box 68) by identifying starting and target (exit) nodes. A complexity heuristic is then selected (box 70). One such heuristic could be the number of logical operators in the conditional statement that terminates each basic block (node). Next, the nodal weights are revised (box 72), either as a result of prior experience (e.g. the path has been previously searched) or as a result of a change in heuristic that indicates a revised value is to be assigned.

Next, the procedure selects a search technique (box 74). Knowledge base 42, itself, may proceed through a plurality of prescribed searches or it may proceed through one search technique and then wait until the user instructs it to proceed with an additional search technique. The objective of the search is to rank each flow path, in an order in accordance with its total sum of nodal weights.

As shown in box 76, the procedure iterates back to box 70 until a condition is met. One such condition may be the performance of a predetermined number of searches or search techniques. If the program is highly complex and contains many flow paths, it may be desirable to terminate a search after a predetermined number of flow paths have been found and ranked, and to then test those individually before proceeding on to an additional set of flow paths. The termination condition is one which is established by the user in accordance with the characteristics of the particular application being tested.

Figure 6:
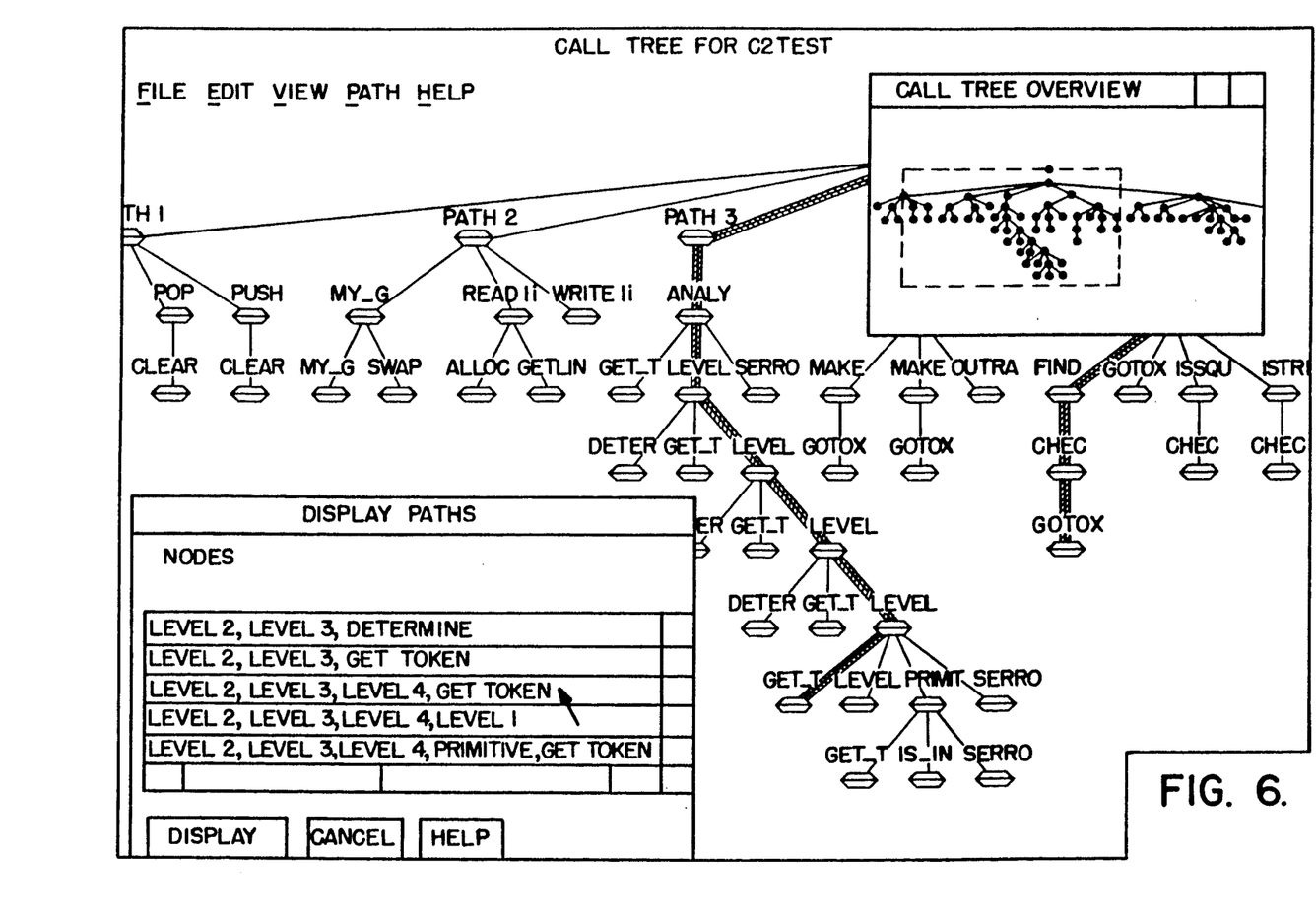
FIG. 6 is an exemplary screen display showing a set of paths in a code listing that are most likely to fail.

Once all of the searching and ranking has occurred, a solution set (box 78) is displayed that indicates the ranked flow paths in order. Also, certain "critical paths" may be displayed by highlighting or being provided with a specific color on a graphical presentation. For example, the user may select a particular graphical presentation to display the flow diagram in such a manner that the critical paths are emphasized. Such a display is shown in FIG. 6. The display of FIG. 6 enables the user to proceed with a node by node analysis of critical flow paths based upon a realization that they are the paths likely to have malfunctions and, thus, are the paths should be tested first or most thoroughly.

To provide an example of source code analysis performed by this invention, assume a series of source statements in a program, as shown below. Each of the source statements that includes a "straight line text" has been segregated into a node, which node is numbered to the left of the source statement.

| NODE | SOURCE STATEMENT |
|---|---|
| . | . |
| . | . |
| . | . |
| 1 | A = 10.6; |
|   | B = A + Z; |
| 2 | C = XYZ (A,B); |
| 3 | IF((A<(Z-5))\|(((Z-5)/(R*B)+sin(B)>Q))) |
| 4 | Then Call Compute (Z,Q); |
|   | B=B + Q; |
| 5 | Else |
|   | M=B; |
| 6 | If (M>Q) then |
|   | M=M+Q; |
| 7 | Else M=M-Q; |
|   | ENDIF; |
| 8 | ENDIF; |
|   | P=B/5.5; |

| NODE | SOURCE STATEMENT |
|---|---|
| | QQ = Q + M * B; |
| . | . |
| . | . |

Figure 7:
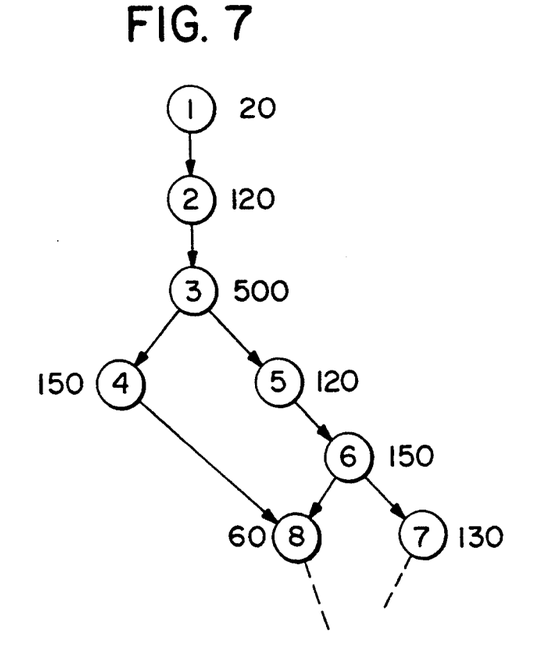
FIG. 7 is an exemplary nodal flow path with each node annotated with a weight value.

A chart of the above source statements is shown FIG. 7, with each of the nodes numbered so as to correspond to an above source statement. The nodes are interconnected as required by the statements. Each node has been assigned a weight based upon the following criteria: if the statement includes a variable, assign a value of 10; if the statement includes an arithmetic operator, assign a value of 10; if a Boolean operator is included, assign a value of 100; if a decision statement is included, assign a value of 100; if a call statement is included, assign a value of 100, etc. Nodes 3 and 7 include decision statements and nodes 2 and 3 include call statements.

The following table indicates the calculated weights assigned to each node in accordance with the aforementioned criteria.

| NODE | WEIGHT* |
|---|---|
| 1 | 20 |
| 2 | 120 |
| 3 | 500 |
| 4 | 150 |
| 5 | 120 |
| 6 | 150 |
| 7 | 130 |
| 8 | 60 |

Once weights are assigned to the nodes (as annotated in FIG. 7), the search routine is commenced and, in this instance, it is assumed that the objective is to rank each path in accordance with its total nodal weight. As can be seen from FIG. 7, three flow paths are illustrated as follows: Path 1=nodes 1, 2, 3, 4 and 8; path 2 =nodes 1, 2, 3, 5, 6 and 7, and path 3 nodes 1, 2, 3, 5, 6 and 8.

The table below indicates the summed weights that are determined by the search routine for each of the flow paths and the ranking of the flow paths in accordance with those weights.

| RANK | PATH | NODES | SUMMED WEIGHTS |
|---|---|---|---|
| 1 | 2 | 1,2,3,5,6,7 | 1040 |
| 2 | 3 | 1,2,3,5,6,8 | 970 |
| 3 | 1 | 1,2,3,4,8 | 850 |

From the above table, it can be seen that path 2 includes the greatest summed weight of nodes and thus would be indicated to the user as the first path to analyze in a testing routine. Next, path 3 would be investigated and last, path 1.

It should be understood that the foregoing description is only illustrative of the invention. Various alternatives and modifications can be devised by those skilled in the art without departing from the invention. For instance, while flow path complexity can be determined by summation of nodal weights along a path, other methods of combining nodal weights to indicate relative path complexity will be obvious to those skilled in the art (e.g., successive multiplication of nodal weights, variations of nodal weights in accordance with a likelihood of traversal of a path, etc.) Accordingly, the present invention is intended to embrace all such alternatives, modifications and variances which fall within the scope of the appended claims.

I claim:

1. A method for determining a set of flow paths in a code listing as being the most likely ones to fail, the method comprising the steps of:
   (a) converting said code listing to a directed acyclic graph (DAG) representation, said DAG including nodes and directed edges, each node representing a basic block of unconditional code statements, a basic block being a code listing that terminates at an exit point once commencing at a starting point, a said exit point being an exit code statement or a conditional code statement, each edge representing an action taken upon the occurrence of a condition in a said conditional code statement;
   (b) loading as facts into a knowledge base, said nodes and directed edges from said DAG and unconditional code statements from each said basic block's code listing;
   (c) loading as rules into said knowledge base, conditional statements from said code listing and determined complexity indicator values for conditional and unconditional code statements;
   (d) assigning a weight in each node based upon a combination of complexity indicator values for conditional and unconditional code statements associated with a said node; and
   (e) determining a set of ranked flow paths through said code listing by employing said facts and rules, said flow paths ranked in order by analysis of each flow path's nodal weights, those flow paths with weights indicating greater complexity being those most likely to fail.

2. The method as recited in claim 1 wherein said determining step (e) is based upon an accumulation of nodal weights in each flow path.

3. The method as recited in claim 1 wherein said complexity indicator values recited in step (c) for each statement comprise indications of the kind and number of logical operators in each said statement.

4. The method as recited in claim 1 wherein said complexity indicator values for conditional statements, are recited in step (c), comprises the number of conditions required to lead to a branch action or actions.

5. The method as recited in claim 1 wherein said complexity indicator values for conditional statements recited in step (c) comprise the number of branches that are indicated by each said conditional statement.

6. The method as recited in claim 1 wherein said assigned weight to a said node is based upon a sum of complexity indicator values of conditional and unconditional statements associated with a said node.

7. The method as recited in claim 1 wherein step (c) further comprises loading as rules, heuristics that determine complexity indicator values based upon a plurality of determined statement characteristics, said characteristics giving rise to complexity of function.

- 8. The method as recited in claim 7 wherein step (e) further comprises:
   searching flow paths in said code listing and summing nodal weights for each found flow path to arrive at a total nodal weight sum for each said found flow path.

9. The method as recited in claim 8 wherein step (e) further comprises:

iterating through a plurality of heuristics in the performance of the search of the flow paths;

modifying assigned nodal weights in accordance with findings that result from individual heuristics; and summing said nodal weights in each path for each said heuristic, whereby a set of nodal weight sums for each path are produced for each said heuristic.

10. The method as recited in claim 1 further comprising the step of:

(f) displaying a graphical representation of flow paths in said code listing, and providing an indication in said graphical representation indicating those flow paths most likely to fail.

11. A data processing system that identifies a set of flow paths in a code listing as being the most likely ones to fail, said system comprising:

means for converting said code listing to a directed acyclic graph (DAG) representation, said DAG including nodes and directed edges, each node representing a basic block of unconditional code statements that ends with an exit code statement or a conditional code statement and each edge representing an action taken upon the occurrence of a condition in a conditional statement that terminates a basic block;

memory means, coupled to said means for converting, for including a knowledge base having facts and rules, said facts including said nodes and directed edges from said DAG and unconditional statements from each said basic block's code listing, said rules including conditional statements from said code listing and determined complexity indicator values for said conditional and unconditional statements; and means coupled to said memory means for assigning a weight to each node based upon a combination of complexity indicator values for conditional and unconditional statements associated with said node, said data processing system determining a set of ranked flow paths through said code listing by employing said facts and rules, said flow paths ranked in order by analysis of each flow path's nodal weights, those flow paths with weights indicating greater complexity being those most likely to fail.

12. The system as recited in claim 11 wherein said data processing system determines said set of ranked flow paths based upon an accumulation of nodal weights in each flow path.

13. The system as recited in claim 11 wherein said complexity indicator value for each statement comprises an indication of the kind and number of logical operators in each said statement.

14. The system as recited in claim 11 wherein said complexity indicator values for conditional statements comprises the number of conditions required to lead to a branch action or actions.

15. The system as recited in claim 11 wherein said complexity indicator values for conditional statements comprise the number of branches that are indicated by each said conditional statement.

16. The system as recited in claim 11 wherein said assigned weight to a node is based upon a sum of complexity indicator values of conditional and unconditional statements associated with said node.

17. The system as recited in claim 11 wherein said data processing system searches flow paths in said code listing and sums nodal weights for each found flow path to arrive at a total nodal weight sum for each said found flow path.

18. The system as recited in claim 17 wherein said processor means iterates through a plurality of heuristics in the performance of the search of flow paths, modifies assigned nodal weights in accordance with findings that result from individual heuristics, and sums said nodal weights in each path for each said heuristic, whereby a set of nodal weight sums for each path are produced for each said heuristic.

19. The system as recited in claim 11 further comprising means for displaying a graphical representation of flow paths in said code listing, and providing an indication in said graphical representation indicating those flow paths most likely to fail.

* * * * *